UNITED STATES PATENT OFFICE.

ALFRED BEDDIES, OF BERLIN, GERMANY.

PROCESS OF MAKING CATTLE-FOOD.

SPECIFICATION forming part of Letters Patent No. 663,802, dated December 11, 1900.

Application filed July 10, 1900. Serial No. 23,107. (No specimens.)

*To all whom it may concern:*

Be it known that I, ALFRED BEDDIES, chemist, a subject of the Emperor of Germany, residing at Berlin, in the Province of Brandenburg, Germany, have invented certain new and useful Improvements in the Manufacture of Cattle-Food, of which the following is a full, clear, and exact description.

As is well known, the supplying of food to animals which comprises concentrated melasse, (beet-sugar residues,) with or without the addition of fibrous materials, has the great disadvantage of possessing numerous salts (which are contained in the melasse) which purge and irritate the alimentary canals of animals and cause numerous disturbances of the digestive organs especially in pregnant animals.

It is the object of my invention to manufacture a cattle-food comprising melasse in such a manner that the peristaltic and diuretic overeffects of the salts in the animal food will be weakened in their action. This object is accomplished through a certain treatment of the cattle-food with a suitable aromatic bitter-herb material which will promote digestion.

My manufacture appears to depend only on the manner of producing the cattle-food already known and the use of aromatic bitter-herb material, since it has for its principal constituents melasse, bran, and woody fiber or the like and as specific auxiliary substances employs, on the one hand, lime for the melasse and, on the other hand, aromatic and bitter herbs for the bran and woody fiber, such herbs as *Menyanthes trifoliata*, (buck-bean,) *Absinthium*, (common wormwood absinth,) *Bursa pastoris*, (shepherds-purse,) &c.

The essential feature or novelty of the manufacture consists in subjecting the auxiliary materials to a certain preliminary treatment. A uniform customary mixture of the desired stuffs with melasse and bran would not be to the purpose, because in such mixture great masses of herbs are necessary in order to attain the desired effect. Therefore on account of the cost of the herbs only very small masses of herbs can be employed. These can, however, by simple mixture and their irregular dispersion of their specific materials, which have a poor effect in combined form, accomplish with difficulty their right effect.

With my invention a herb mixture is produced which is incorporated in the food. In order to decompose the bitters contained in the mixture which are mostly glucosides, and to make them active, a thin melasse solution is employed and the herb mixture mixed therewith. By this treatment I accomplish the following result: While the common concentrated melasse, especially as concentrated sugar syrup, has the effect of an antiseptic and destroys the fermentation process, a thin melasse solution accelerates the commencement of fermentation. Accordingly as soon as the herbs containing proper bitters in the form of glucosides are mixed with thin melasse solution there appears very soon a very light organic acid fermentation and through this the glucosides are broken up—that is to say, the active stuffs in the plants are made free—so that when they are next conserved by the addition of the concentrated melasse they can immediately, when the food is given to the animal, exercise their specific effect and during the whole course of digestion in the animal's body. There is employed, therefore, in my production of food a very much smaller quantity of herbs or seeds containing bitters for destroying the action of the salts contained in the melasse than in the previous manufacture of such foods.

In carrying out my invention I proceed in the following manner: Herbs containing an abundance of glucosides are broken up in the dry state and then soaked in a one-per-cent. solution of melasse. This mass is allowed to stand for two days at the ordinary temperature, and then it is mixed in the proportion of from one to twenty parts to one to fifty parts with concentrated melasse already mixed with fibrous materials, such as bran, chopped straw, and finally also with lime.

Instead of using only bitter herbs in the first state of fermentation there can be added to the bitter herbs from five per cent. to ten per cent. of bran and then a thin solution of melasse to induce the fermentation.

Having thus described my invention, the following is what I claim as new therein and desire to secure by Letters Patent:

1. In the manufacture of cattle-food taking bitter herbs rich in glucosides, mixing therewith a thin solution of melasse, allowing the mass to stand for about two days at ordinary temperature and then adding it to a mixture of concentrated melasse, woody fiber and lime.

2. In the manufacture of cattle-food taking bitter herbs rich in glucosides, breaking up the herbs in a dry state, then soaking the herbs in about one-per-cent. thin solution of melasse, allowing the mass to stand for about two days at ordinary temperature, and then adding it to a mixture of concentrated melasse, woody fiber and lime in about the proportion of one part of the mass to from twenty to fifty parts of the mixture.

In witness whereof I subscribe my signature in presence of two witnesses.

ALFRED BEDDIES.

Witnesses:
 WILHELM PETZEL,
 HENRY HASPER.